(12) United States Patent
Kleipa

(10) Patent No.: US 10,171,010 B2
(45) Date of Patent: Jan. 1, 2019

(54) METHOD AND APPARATUS FOR GENERATING ENERGY USING PIEZO ELEMENTS

(71) Applicant: GSI HELMHOLTZZENTRUM FUER SCHWERIONENFORSCHUNG GMBH

(72) Inventor: Volker Kleipa, Seligenstadt (DE)

(73) Assignee: GSI HELMHOLTZZENTRUM FUER SCHWERIONENFORSCHUNG GMBH, Darmstadt (DE)

( * ) Notice: Subject to any disclaimer, the term of this patent is extended or adjusted under 35 U.S.C. 154(b) by 573 days.

(21) Appl. No.: 14/414,137

(22) PCT Filed: Jul. 11, 2013

(86) PCT No.: PCT/EP2013/064719
§ 371 (c)(1),
(2) Date: Jan. 12, 2015

(87) PCT Pub. No.: WO2014/012845
PCT Pub. Date: Jan. 23, 2014

(65) Prior Publication Data
US 2015/0180375 A1    Jun. 25, 2015

(30) Foreign Application Priority Data
Jul. 16, 2012    (DE) ......................... 10 2012 106 376

(51) Int. Cl.
*H02N 2/18*    (2006.01)
*H01L 41/113*    (2006.01)

(52) U.S. Cl.
CPC ................................... *H02N 2/18* (2013.01)

(58) Field of Classification Search
CPC ............... H01L 41/113; H01L 41/1132; H01L 41/1134; H01L 41/1136; H01L 41/1138
USPC .......................................................... 310/339
See application file for complete search history.

(56) References Cited

U.S. PATENT DOCUMENTS

| 3,539,841 | A  | 11/1970 | Riff |
| 5,637,937 | A  | 6/1997  | Nakajima |
| 7,696,673 | B1 | 4/2010  | Yavid |
| 2010/0052324 | A1 | 3/2010 | Priya |
| 2011/0278990 | A1 | 11/2011 | Knowles et al. |
| 2012/0013745 | A1 | 1/2012  | Kang et al. |

FOREIGN PATENT DOCUMENTS

| CN | 102025289 A | 4/2011 |
| DE | 2612099 B1  | 8/1977 |
| DE | 69324603 T2 | 9/1999 |
| DE | 10054398 A1 | 5/2002 |
| DE | 102004055625 A1 | 6/2006 |
| DE | 102007059179 A1 | 6/2009 |

(Continued)

*Primary Examiner* — Derek Rosenau
(74) *Attorney, Agent, or Firm* — Leydig, Voit & Mayer, Ltd.

(57) ABSTRACT

An energy-generating apparatus includes at least one magnetic field-generating apparatus configured to at least intermittently generate a magnetic field that varies over time. The energy-generating apparatus also includes at least one magnetic field interaction means and at least one energy-generating apparatus designed as a piezo element device.

17 Claims, 5 Drawing Sheets

(56) References Cited

FOREIGN PATENT DOCUMENTS

| | | | |
|---|---|---|---|
| DE | 102009033403 | A1 | 4/2010 |
| JP | 2002369554 | A | 12/2002 |
| JP | 2003189641 | A | 7/2003 |
| JP | 2005045870 | A | 2/2005 |
| WO | WO 0060369 | A1 | 10/2000 |
| WO | WO 2007121265 | A1 | 10/2007 |
| WO | 2011059129 | A1 | 5/2011 |
| WO | WO 011059127 | A1 | 5/2011 |

METHOD AND APPARATUS FOR GENERATING ENERGY USING PIEZO ELEMENTS

CROSS-REFERENCE TO RELATED APPLICATIONS

This application is a U.S. National Phase application under 35 U.S.C. § 371 of International Application No. PCT/EP2013/064719 (WO 2014/012845 A1), filed on Jul. 11, 2013, and claims benefit to German Patent Application No. DE 10 2012 106 376.1, filed Jul. 16, 2012.

FIELD

The present invention relates to energy-generating apparatuses and methods, and in particular, to energy-generating apparatuses that include a piezo element device and to methods of generating energy using at least one piezo element device.

BACKGROUND

In order to generate electrical energy, it is generally necessary, as a rule, for mechanical movements to be converted into electrical energy. In this case, the mechanical movements can be generated in many different ways. For example, heat engines, crank handles or mechanical energy generated by renewable energy forms (for example wind power, hydro power and the like) can be considered. In particular in the case of more decentralised plants, the present power outputs to be converted are rather small in comparison to central power stations (coal-fired power stations, nuclear power stations and the like). This also applies particularly to wind turbines and hydroelectric power stations (in the latter case in particular small hydroelectric power stations), where the mechanical output generated per unit is rather small. So-called energy harvesting is also being proposed increasingly, where electrical energy is generated from sources such as fluctuations in ambient air temperatures, vibrations or air currents. In this case, comparatively low electrical outputs are typically generated which serve to operate mobile devices with low electrical energy requirements in particular.

For example, on a wind farm, each individual wind turbine typically drives its own generator, the mechanical output generated per wind turbine being comparatively low. This is compensated by an accordingly large number of wind turbines. Staying with the example of wind power, since it is desirable, as far as possible, to install the generator in the direct vicinity of the wind turbine in order to keep transmission losses as low as possible, it is also desirable to construct the generator as small, light and compact as possible such that it can be accommodated advantageously in the nacelle of a wind turbine, for example.

Moreover, the economic aspect must also naturally always be considered, not only in relation to the cost of the generator itself but also, in particular (to return once more to the example of wind turbines) the cost of assembly (fixture to high towers) needs to be considered.

Among the diverse options for generating electrical energy, the use of piezo elements has already been proposed in prior art. Said piezo elements have reached a level in the meantime such that they can generate electrical outputs which are absolutely suitable for operating electrical devices. Electrical generators using piezo elements were described for example in the German patent DE 26 12 099 B1, German Offenlegungsschrift DE 100 54 398 A1 and the German application DE 10 2009 033 403 A1. All of the electrical generators described therein, however, exhibit mechanical contact between a moving device and the piezo element. By these means, the mechanical pressure, which varies over time and which is required for the electricity generation by the piezo element, is generated. One problem with the electrical generators proposed therein is precisely this mechanical contact, which varies over time. This leads to in part considerable frictional losses, not inconsiderable mechanical wear, in part considerable operating noises and corresponding mechanical wear. A further disadvantage of such electrical generators is their sensitivity to even only slight length variations (such as can easily arise from thermal distortion or mechanical loads). Since piezo elements only typically deform within a range of a few 10 μm to a few 100 μm during operation, "unintentional" length variations can quickly reach or exceed a critical range. Accordingly, it is necessary in the case of previous piezo generators requiring contact to provide buffer elements, which prevent mechanical overload. Altogether this leads to considerable disadvantages, which render the generators proposed therein technically and also in particular economically unsuitable for a large number of fields of application.

Although a large number of different energy generating devices have already been proposed in prior art and these have also achieved a respectable level of development, there is still a need for improvements.

SUMMARY

In an embodiment, the present invention provides an energy-generating apparatus that includes at least one magnetic field-generating apparatus configured to at least intermittently generate a magnetic field that varies over time, at least one magnetic field interaction device, and at least one energy-generating apparatus device including a piezo element device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
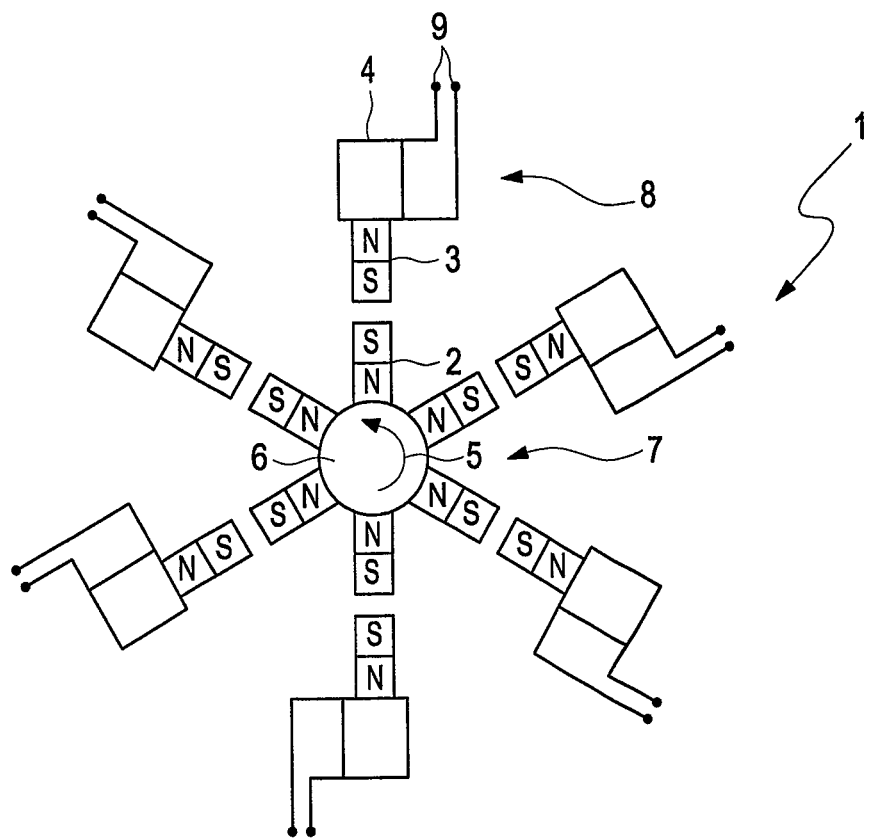
FIG. 1 is a schematic plan view of a first embodiment of a piezo generator.

In an embodiment, the present invention provides an energy-generating apparatus that is improved in comparison to known energy-generating apparatuses in the prior art. Moreover, an embodiment of the present invention provides a method for generating electrical energy that is improved in comparison to known methods for generating electrical energy in the prior art.

An embodiment of the invention provides an energy-generating apparatus, which has at least one magnetic field-generating apparatus, at least one magnetic field interaction means, and at least one energy-generating means constructed as a piezo element device in such a way that the magnetic field-generating apparatus is designed and set up in such a way that it at least intermittently generates a magnetic field that varies over time. In this case, the construction of the energy-generating apparatus is normally such that the magnetic field generated by the magnetic field-generating apparatus acts on the at least one magnetic field interaction means or interacts therewith. An interaction normally occurs in such a way that the interaction predominantly, preferably substantially, takes place by means of the magnetic field. In particular, normally no, or at least no substantially mechanical, contact occurs between the magnetic field-generating apparatus and the at least one magnetic field interaction means. The advantage of this in comparison to some known energy-generating apparatuses in prior art is in part considerably reduced mechanical wear, reduced friction, in part more cost-effective construction (since, in the case of mechanical contact devices, often costly friction-reducing devices and/or tempering have to be provided) and a normally increased service life with normally lower operating noises. A further advantage is that buffer elements, which are currently normally necessary in order, for example, to prevent mechanical overload as a result of thermal distortion or mechanical deformation, can be omitted as a rule. The magnetic field interaction means are normally directly connected in a mechanical manner to the piezo element devices. These interaction means can therefore transmit a mechanical force, which is ultimately caused by the magnetic field that varies over time, onto the at least one piezo element device to which said interaction means are connected. The mechanical energy, which the piezo element devices need in order to be able to generate electrical energy, can hereby be provided. Normally, the magnetic field that varies over time always varies over time when the energy-generating apparatus is in an operating mode, i.e. electrical energy is being generated. In this case, the variation of the magnetic field that varies over time can relate to the strength as well as the location of the magnetic field (and naturally also to both). Moreover, the magnetic field interaction means can be constructed in such a way that it generates a kind of magnetic field itself (i.e. for example it can be current-carrying electrical conductors, electrical conductor loops, permanent magnets or the like) but can also be constructed in such a way that it interacts in combination with a magnetic field without itself generating a (considerable) magnetic field (for example ferromagnetic materials). Moreover, one advantage in using the proposed apparatus is that when generating the electrical energy, comparatively few harmonics are usually generated. Accordingly, the problem of EMC is distinctly easier to control. Simple attenuators are usually already adequate (if they are needed at all) in order to achieve an effective suppression of harmonics. A further advantage in the case of at least some of the proposed energy-generating devices is that these react relatively insensitively to sometimes high temperatures. Conventional generators can be used ideally in a temperature range of up to 200° C., for example. Using piezo element devices, however, temperatures of up to 400° C. and above can normally be contained comparatively simply. This normally makes electrical conductors that are accordingly suitable for high temperatures necessary to conduct the electricity away (such as tungsten wires, which normally lead to poorer efficiency of the whole arrangement because of the relatively low electrical conductivity in comparison to copper but do make their use in such temperature ranges possible in the first place). The proposed energy-generating apparatus is ultimately also more suitable for high-vacuum applications in principle. This is because customary electrical generators must have suitable insulation means to prevent flashovers. Only relatively few insulation means can be used, especially in the high-vacuum field, however, in particular due to the outgassing behaviour of many electrically insulating materials). Since in the case of the proposed energy-generating apparatus, significantly fewer insulation means usually have to be used (in comparison to conventional generators), the use of said apparatus in the high-vacuum field is therefore usually significantly easier to achieve. In particular, a piezo element device can be a single piezo element or a "stack of piezo elements" (i.e. a kind of "serial arrangement" of the piezo elements) such that the achievable voltage can be increased, for example. In other words, the construction can be such that a compressive load (and also a tensile load if appropriate) at one single point on the piezo element device leads to voltage generation in a plurality of piezo elements of the piezo element device. It should be pointed out in this connection that piezo elements have a kind of two-dimensional construction. In the case of a "serial arrangement", two-dimensional surface areas of individual piezo elements are normally interconnected or contacted to one another.

In this case, it is proposed that at least one magnetic field interaction means is mechanically connected at least substantially rigidly to at least one piezo element device and/or at least one piezo element device is mechanically connected at least substantially rigidly to at least one corresponding part of the energy-generating apparatus and/or at least one magnetic field-generating apparatus is mechanically connected at least substantially rigidly to at least one corresponding part of the energy-generating apparatus. A "corresponding part of the energy-generating apparatus" can be parts of a housing device, for example, parts of a retaining device for magnetic field-generating means, piezo element devices and/or magnetic field interaction means or the like. In other words, no spring devices, bending rod devices or other mechanically reversible deformable devices are provided, such as those provided in connection with energy-generating apparatuses, for example, which use resonance effects in the generation of electrical energy. A "substantially rigid mechanical connection" can be achieved, for example, by a substantially flush adjoining of the components concerned or by means of a mechanical connection of the components concerned (purely by way of example, bonding processes or the like can be mentioned here).

Furthermore, it is proposed that in the case of the energy-generating apparatus, the magnetic field-generating apparatus is designed and set up in such a way that it generates a movable magnetic field, in particular a rotating and/or a cyclically changeable magnetic field. While it is possible in principle for the orientation of the magnetic field to remain substantially constant and for only its strength to vary over time, it has proven to be normally preferable for practically relevant constructions for (at least also) the local orientation of the magnetic field that varies over time to change. By means of such a movement of the magnetic field, a magnetic field having a strength that (also) varies over time can then be generated at different points of for example rigidly fixed devices, such as in particular in the region of at least one magnetic field interaction means (or at least part of it) "from the viewpoint of the respective point". As a result of this, it is not absolutely necessary to design the magnetic field-generating apparatus such that its own strength varies over time. This normally leads to simpler superstructures of the magnetic field-generating apparatuses. In particular, it is also possible to use special types of magnetic field-generating apparatuses, which could otherwise not be used, or at best only with difficulty, such as permanent magnet devices. In particular, it is possible to achieve a movable magnetic field by a (partial) movement of the at least one magnetic field-generating apparatus and/or by a movement of a retaining device, to which at least one magnetic field-generating apparatus is fixed. Thus, a rotating magnetic field in particular can be achieved by a correspondingly moving magnetic field-generating apparatus, such as by a simple rotational movement in particular. This is also equivalent to the "mechanical energy supply" of conventional generators, such that the resulting energy-generating apparatus can be used as a "drop in" solution, for example, which can significantly increase its acceptance. A cyclically changeable magnetic field can, however, also be achieved by a reciprocal movement ("pitch-like" movement). This is particularly advantageous if the mechanical movement is already provided as a reciprocal movement. Separate devices for converting such a reciprocal movement (pitch movement) into a rotational movement can then be omitted in particular (which normally also entails lower mechanical losses).

A further embodiment provides an energy-generating apparatus where at least one magnetic field-generating apparatus and/or at least one magnetic field interaction means is designed as an electrical conductor loop device, in particular as an electric coil device. In the case of such a configuration, it is possible to generate comparatively strong magnetic fields such that the possible aggregate electrical output to be generated or the convertible, mechanical output can be particularly high. A further advantage of such a construction can be that the magnetic fields in particular can be varied comparatively slowly. As a result of this, a varyingly strong coupling of magnetic field-generating apparatus and magnetic field interaction means can be achieved, for example. As a result of this, the resulting energy-generating apparatus can be adjusted if necessary to changing operational requirements. In particular, a fluctuating demand for electrical load can also be reacted to as a result. In particular when using a plurality of magnetic field-generating apparatuses and/or a plurality of magnetic field interaction means, it is possible for a part thereof to be "switched off". Also as a result of this it is possible, if necessary in a particularly simple manner, to adjust the energy-generating apparatus to different prevailing conditions. When using electrical conductor loop devices (electric coil devices) superconductive materials in particular can also be considered.

Furthermore, it is additionally or alternatively proposed in the case of the energy-generating apparatus for at least one magnetic field-generating apparatus and/or at least one magnetic field interaction means to be designed as a permanent magnet device. In the case of such a construction, it is possible for no electrical energy to be required to operate the magnetic field-generating apparatus and/or the magnetic field interaction means. In particular, the resulting energy-generating apparatus can thus be particularly resilient. Particularly when using contemporary permanent magnets based on special materials, remarkably strong magnetic fields can also be generated using permanent magnets. A further advantage of such a construction can be that, in particular in the case of moving parts, the sometimes complex electrical energy supply (for example by means of slip rings or the like) can be omitted, which can help simplify the construction of the energy-generating apparatus. Just for the sake of completeness it should be mentioned that it is naturally also possible to use an electric coil and a permanent magnet simultaneously, for example, such that the magnetic field of the permanent magnet can be varied, in particular strengthened, by the electric coil. Moreover, a varyingly strong coupling, for example by means of a variation of a gap, can also be achieved when using permanent magnets.

A further embodiment of the energy-generating apparatus provides a plurality of permanent magnet devices that are arranged in particular on top of one another with opposite poles in sequence and/or which are arranged in particular along a closed periphery, preferably along a circle. In this case, the plurality of permanent magnet devices can relate to the at least one magnetic field-generating device as well as the at least one magnetic field interaction means or to both (or a plurality). By means of an alternating arrangement of permanent magnet devices, a tensile and compressive force can be generated alternately in particular in the case of cyclical passage through a magnetic field (in particular of a magnetic field whose polarity changes). As a result, the effectiveness of the energy-generating apparatus can be increased significantly if applicable. In particular a "recovery phase" between two pressure pulses can also be reduced over time. The same idea is naturally also possible when using electrically generated magnetic fields or when using "electrically strengthened permanent magnet fields".

Furthermore, it is proposed to design the energy-generating apparatus such that a plurality of piezo element devices is provided, which are arranged in particular along a closed periphery, preferably along a circle. In this case, the plurality of piezo element devices can be arranged and/or used virtually "parallel to one another". The piezo element devices can therefore be arranged next to one another, it being possible for the piezo element devices to be arranged at least in part directly adjacent to one another (and touch one another in the process, if applicable; it also being possible to interpose insulating elements), as well as for at least some of the piezo element devices to be arranged at a certain distance from one another (which can, for example, be in the order of "half a size" or a "whole size" of a single piezo element device). By means of such an arrangement, on the one hand electrical energy can be generated with low ripple. On the other hand, the generated electrical output can be significantly increased in part with a simultaneously more compact construction. Just for the sake of completeness it should be pointed out that piezo element devices can naturally also be constructed from a plurality of piezo elements, in particular in the form of a kind of "serial" arrangement in order to increase the electrical output for a single piezo element device. In this case, the arrangement along a closed periphery is carried out in particular such that the magnetic field that varies over time is exploited as optimally as possible. This is the case, for example, if the piezo element devices are arranged in a region in which the (locally sensed) magnetic field fluctuations are particularly strong. A circle is suitable, for example, when a magnetic field interaction means is moved rotationally.

A further embodiment of the energy-generating apparatus provides for the variation of the magnetic field over time, in particular the movement, preferably the rotation and/or the cyclical change of the magnetic field is generated by a mechanical movement, in particular of the at least one magnetic field-generating apparatus. This normally accommodates the customary requirement that is prevalent in technology for the use of energy-generating apparatuses (generators) particularly well. In particular it should be pointed out that the majority of electrical generators currently used in prior art are driven by the coupling of a mechanical rotational movement. There are, however, also some "original" reciprocal movements, the generation of a magnetic field that varies over time then being appropriate using a reciprocal movement (pitch movement). As a result of the proposed construction, in particular a "drop in" solution is thus possible, which can significantly increase the acceptance of the energy-generating apparatus. Moreover, the energy-generating apparatus can be comparatively simple in its construction and/or application as a result of the proposed construction.

Furthermore, it is proposed to construct the energy-generating apparatus in such a way that at least one magnetic field interaction means is assigned to at least two piezo element devices, in particular a plurality of piezo element devices and more preferably a single magnetic field interaction means is assigned to a group of piezo element devices. In this case, the one or more magnetic field interaction means are "assigned" to the piezo element devices in particular with regard to piezo element devices, which are "arranged parallel to one another". Such a construction can then prove advantageous in particular if the magnetic field interaction means is designed to be intrinsically movable/deformable (it being necessary to point out that as a result of the only slight length variations, such that occur during the deformation of piezo element devices, a comparatively slight mechanical deformability is sufficient). This can be the case, for example, in the case of an electrical conductor loop. Here a respective region of the magnetic field that varies over time usually acts on a portion of the magnetic field interaction means concerned. The respective portion of the magnetic field interaction means concerned can then be in mechanical contact with one of the two (or of a plurality of) piezo element devices. In particular, this can be a "substantially non-deformable mechanical contact" (therefore without a spring device or other reversible mechanically deformable devices, as usually used in energy-generating apparatuses that use resonance effects). As a result of such a construction, the energy-generating apparatus can be constructed in a simpler and/or more compact manner, if applicable. In particular, the efficiency of the energy-generating apparatus can also be increased as a result and/or the controllability of the energy-generating apparatus can be simplified.

Furthermore, it is proposed that the energy-generating apparatus is designed in such a way that a tensile connection is provided between at least one region of at least one magnetic field interaction means and at least one piezo element device. As a result of this, energy can be generated by the piezo element device concerned not only "under pressure" but (also) "under tension". As a result of this in particular the compactness and/or efficiency of the energy-generating apparatus can be significantly increased in part, which has corresponding advantages.

Furthermore, a method for generating electrical energy using at least one piezo element device is proposed, where the at least one piezo element device is deformed by the effect of a magnetic field that varies over time, the magnetic field preferably being varied over time by a mechanical movement. In the case of a method carried out in such a way, the advantages and properties described above in connection with the proposed energy-generating apparatus can emerge in at least an analogous manner. It is also possible in this case for the method to be improved at least in an analogous manner in the light of the description above. Here too, the advantages and properties already described above emerge at least in an analogous manner. Just for the sake of completeness it is pointed out that deformations of piezo element devices typically range from a few 10 μm to a few 100 μm. The mechanical energy can be provided for example by small power stations (hydro power, wind power, thermal energy, geothermal energy or thermal solar energy) and/or by so-called "energy harvesting".

FIG. 1 is a schematic, perspective plan view of a first possible embodiment of a piezo generator 1. The present piezo generator 1 shown has six rotating permanent magnets 2 (the direction of rotation is indicated by an arrow 5), which are fixed to a fulcrum 6. The rotating permanent magnets 2 rotate together with the fulcrum 6. The fulcrum 6 is driven, for example, by the blades of a wind generator, a combustion engine or the like. In the present embodiment shown, the orientation of the rotating permanent magnets 2 (i.e. the arrangement of north pole and south pole of the respective permanent magnets 2) are each selected, namely in the present case, such that the south pole points outwards away from the fulcrum 6, whereas the north pole points inwards towards the fulcrum 6. A reverse arrangement is naturally also feasible. A different quantity of rotating permanent magnets 2 is also easily possible. The combination of rotating permanent magnets 2 and the fulcrum 6 is described in the present case based on classic generators as rotors 7.

The stator region 8 (choice of name also based on "classic" generators) can be seen on the radial periphery of the rotor 7, in the case of the piezo generator 1 shown in FIG. 1. The stator 8 has, in the present case likewise six, securely arranged permanent magnets 3, which are each arranged in mechanical contact with piezo elements 4. In the case of the piezo generator 1 shown in FIG. 1, the arrangement of the fixed permanent magnets 3 is selected such that the south poles of the permanent magnets 3 are each located pointing inwards towards the fulcrum 6 (the north poles of the fixed permanent magnets 3 point outwards accordingly). However, a different arrangement of the fixed permanent magnets 3 is also possible. In particular, the "combined" arrangement and orientation of rotating permanent magnets 2 and fixed permanent magnets 3 should be selected such that when the rotor 7 revolves, at least intermittent repulsion effects occur between rotating permanent magnets 2 and fixed permanent magnets 3 since the generation of electrical energy in the piezo elements 4 takes place particularly effectively under compressive load (tensile loading is less effective in contrast).

Moreover, it is also possible for a different quantity of fixed permanent magnets 3 and/or piezo elements 4 to be selected for the stator 8. Although it is advantageous for the quantity of rotating permanent magnets 2 in the rotor 7 and fixed permanent magnets 3 in the stator 8 to be identical, it is also perfectly possible for the quantities to differ from one another. In addition, it makes sense for the rotating permanent magnets 2 and/or the fixed permanent magnets 3 to (each) be arranged at a substantially equal angular distance from one another. Furthermore, it should be pointed out that a comparatively large distance between the outsides of the rotating permanent magnets 2 and the insides of the fixed permanent magnets 3 is shown in FIG. 1 for technical drawing reasons. Preferably however, this distance is selected to be as small as possible, but large enough for there to be no contact between the rotating permanent magnets 2 and the fixed permanent magnets 3 even under unfavourable conditions. That is to say that a distance that is as small as possible usually increases the efficiency of the piezo generator 1.

In the case of the relative positions of rotor 7 and stator 8 shown in FIG. 1, the rotating permanent magnets 2 and the fixed permanent magnets 3 repel each other. This leads to a corresponding application of pressure on the piezo elements 4 (which are in mechanical contact with the fixed permanent magnets 3, as mentioned). As a result of the application of pressure, the piezo elements 4 generate an electrical output, which can be tapped at contact terminals 9. Depending on the specific requirements of the application, the piezo elements 4 can be connected to the contact terminals 9 (in part) in parallel and/or in series to one another by means of appropriate interconnections. A use of (parts of) the piezo elements 4 independently of one another is naturally also possible.

If the stator 7 is moved further away from the position shown in FIG. 1 (by way of example) towards the arrow 5 showing the direction of rotation, the distance between the respective south poles of the rotating permanent magnets 2 and the fixed permanent magnets 3 increases such that the pressure on the piezo elements 4 decreases again. These elements "recover" and are ready for a new energy generating pulse, which occurs when the stator 7 rotates further (in the present case due to the 6-pointed geometry a "common current generating pulse" of all piezo elements 4, in each case following a rotational movement of 60° of the rotor 7.

Figure 2:
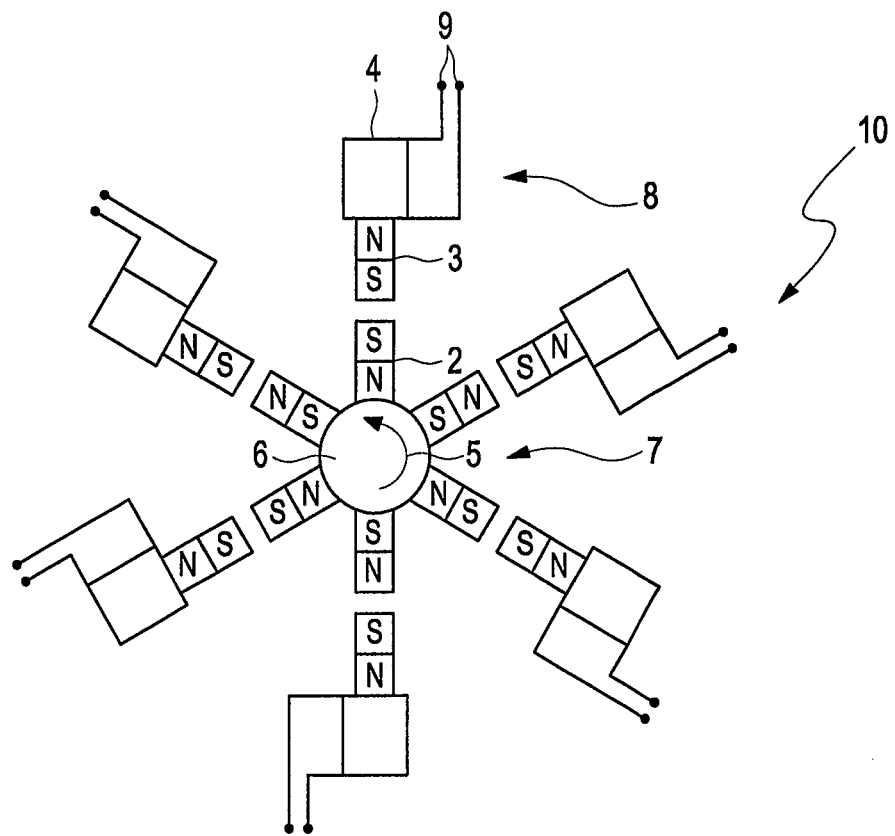
FIG. 2 is a schematic plan view of a modification of the first embodiment of the piezo generator shown in FIG. 1.

In FIG. 2, a piezo generator 10 is shown, which constitutes a variation of the piezo generator 1 shown in FIG. 1. FIG. 2 is also a schematic plan view of the piezo generator 10.

As can be seen from FIG. 2, the rotating permanent magnets 2 arranged in the rotor 7 on the fulcrum 6 are each arranged antiparallel to one another such that the south pole then the north pole and then the south pole again (etc.) of the respective rotating permanent magnets 2 point outwards alternately one after the other. In contrast, the fixed permanent magnets 3 of the piezo generator 10 are arranged analogous to the piezo generator 1 shown in FIG. 1, i.e. such that all of the south poles of all of the fixed permanent magnets 3 point inwards towards the rotor 7.

A series of consecutive pressure and tensile loads of the piezo elements 4 occurs following each rotation of the rotor 7 by 60° (cf. the arrow 5 showing the direction of rotation) due to the selected arrangement of rotating permanent magnets 2 and fixed permanent magnets 3 (the connection between the fixed permanent magnets 3 and each corresponding piezo element 4 is designed in each case to be resilient under tension). Although the piezo elements 4 generate comparatively little electrical energy under tensile load, the proposed configuration of the piezo generator 10 with "antiparallel arrangement of the permanent magnets" can nevertheless be advantageous because the "recovery phase" of the piezo elements 4 can be supported by magnetic forces. Moreover, the proposed configuration is usually particularly advantageous if a comparatively large quantity of rotating permanent magnets 2 and/or fixed permanent magnets 3 is used.

Just for the sake of completeness, it should be mentioned that it is naturally also possible to arrange or orientate each fixed permanent magnet 3 antiparallel to one another in addition or alternatively to the rotating permanent magnets 2.

Figure 3:
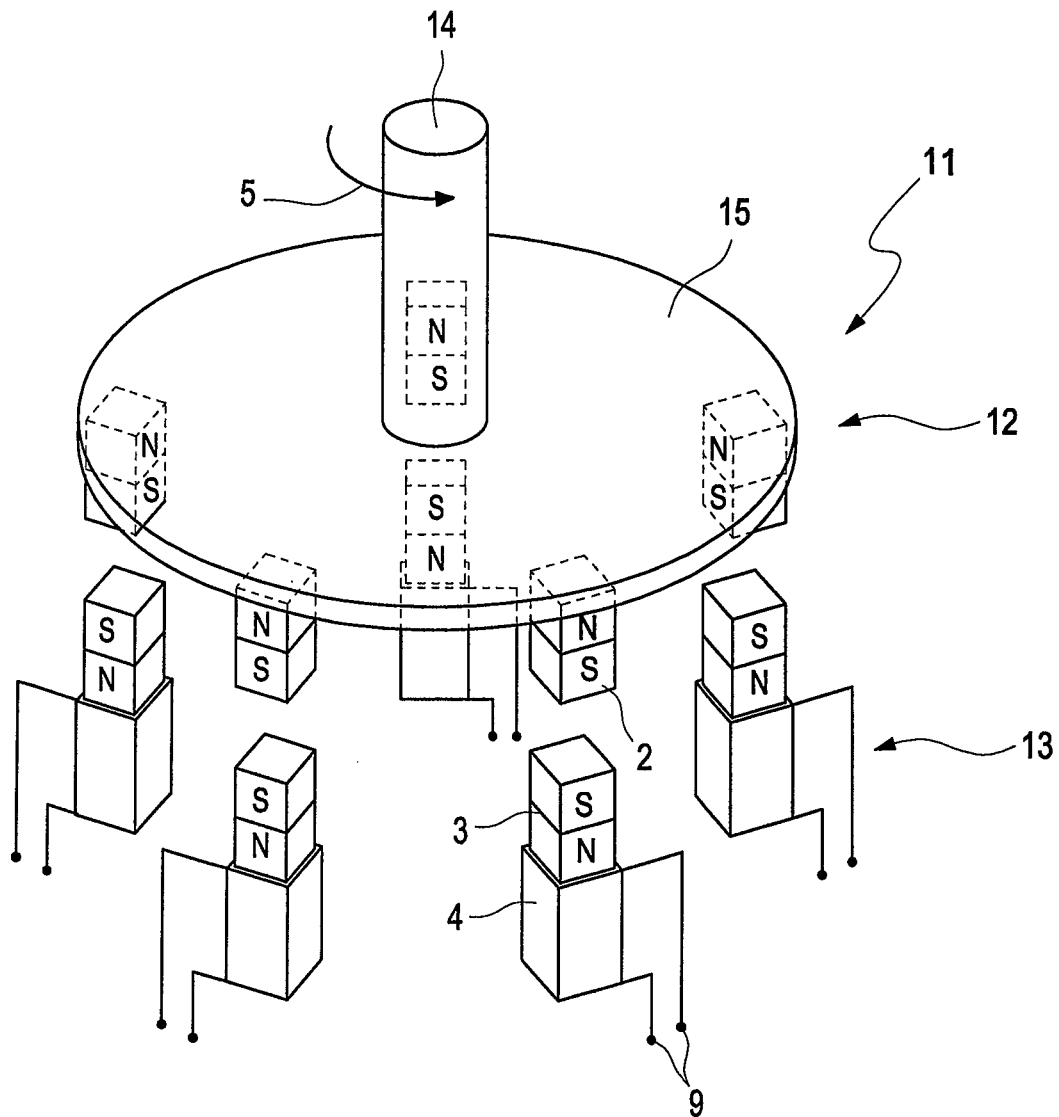
FIG. 3 is a schematic, perspective view of a second embodiment of a piezo generator.

In FIG. 3 a schematic perspective view of a further, second embodiment of a piezo generator 11 is shown. The rotor region 12 and the stator region 13 are arranged here axially to one another (regarded in relation to the fulcrum 14).

A rotating disc 15 is fixed at one end of the fulcrum 14. A plurality of rotating permanent magnets 2 is fixed on the plane of the rotating disc 15 opposite the fulcrum 14. A total of five rotating permanent magnets 2 can be seen in the present selected perspective view. The rotating disc 15 together with the fulcrum 14 constitutes the rotor region 12.

The stator region 13 arranged next to the rotor 12 has a plurality of fixed permanent magnets 3 (in the present case likewise five fixed permanent magnets 3, corresponding to the quantity of rotating permanent magnets 2), which are each mechanically connected to a piezo element 4 (preferably in a manner that is resilient under tension). Also in the present case, the electrical energy generated by the piezo elements 4 in particular under compressive load can be tapped via contact terminals 9 (the connection of the contact terminals can be selected depending on the specific requirements).

In the case of the embodiment of a piezo generator 11 shown in FIG. 3, the south poles of the rotating permanent magnets 2 and of the fixed permanent magnets 3 are each arranged pointing towards one another. Here too, other arrangements are feasible, such as in particular a "completely reversed" arrangement and/or an (in part) antiparallel arrangement of the permanent magnets 2, 3. A different quantity of rotating permanent magnets 2 and/or fixed permanent magnets 3 and/or piezo elements 4 is of course also feasible. In particular in the case of an (in part) antiparallel arrangement, an even number of rotating permanent magnets 2 and fixed permanent magnets 3 normally makes sense.

The functionality of the piezo generator 11 shown in FIG. 3 is similar to the piezo generators 1, 10 described above. When the rotor 12 is rotated (by way of example) in the direction of rotation (indicated by the arrow 5 showing the direction of rotation) there is regularly a strong repulsion of rotating permanent magnets 2 and fixed permanent magnets 3 when these are located opposite one another. This repulsion brings about a corresponding pressure on the piezo elements 4, which generate electrical energy as a result, which can be tapped at the contact terminals 9.

Figure 4:
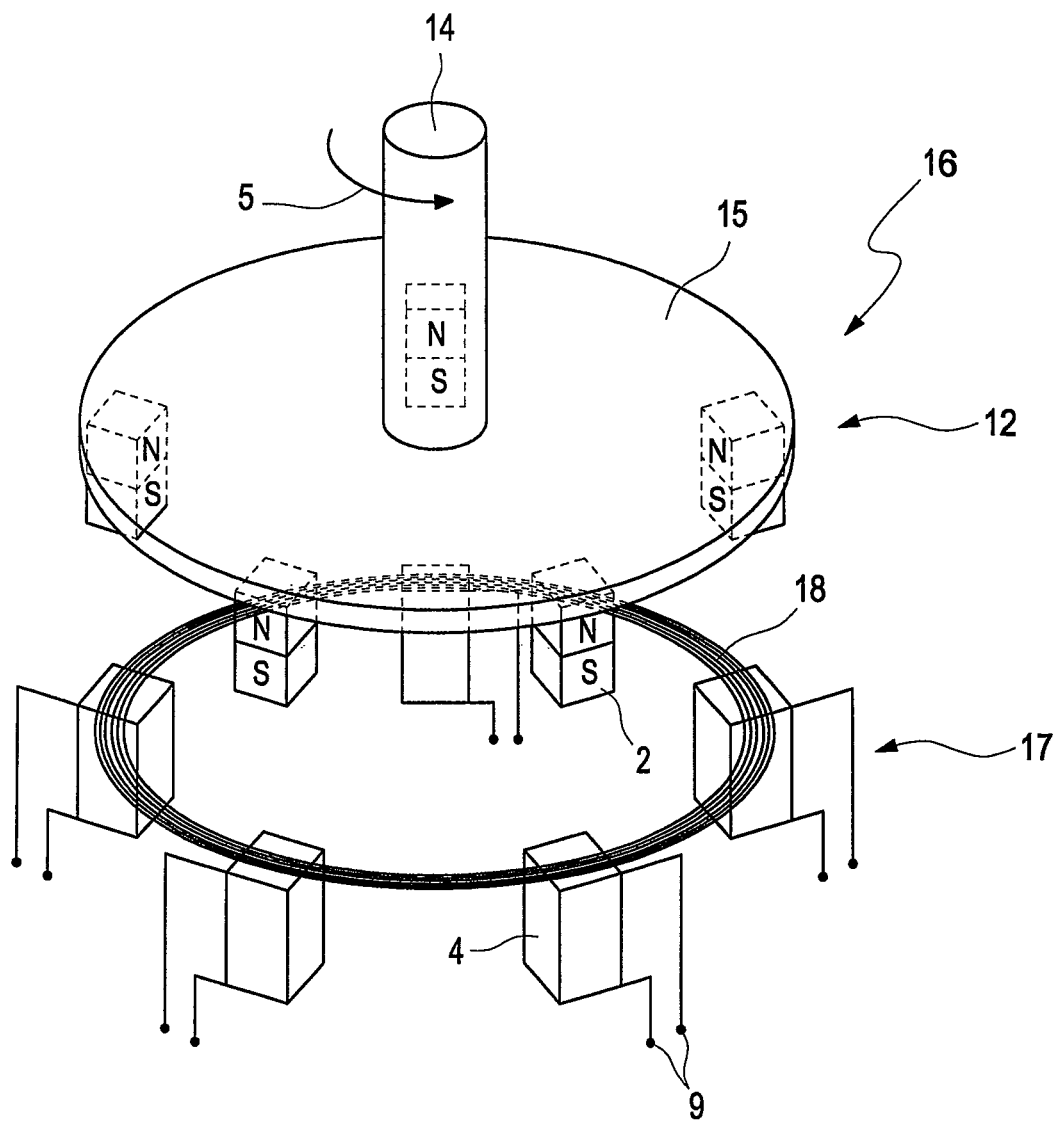
FIG. 4 is a schematic, perspective view of a third embodiment of a piezo generator.

A further possible embodiment of a piezo generator 16 is shown in FIG. 4. The configuration of the rotor 12 in the present case is substantially identical to the rotor 12 of the piezo generator 11 shown in FIG. 3. The stator 17, however, is modified.

In FIG. 4 a quantity of piezo elements 4 can be seen again which supply electrical energy that can be tapped via contact terminals 9. The pressurisation of the piezo elements does not occur by means of permanent magnets (which up to now have acted as magnet field interaction means) in the present case, however, but rather by means of a single horizontal electric coil 18. In the present case, the electric coil 18 is configured as a superconductive coil and has a certain internal flexibility. The corresponding portions of the electric coil 18 are connected to the corresponding end regions of the piezo elements (preferably in a manner that is resilient to tension). When a current flows through the electric coil 18, the individual conductors each generate a magnetic field (magnetic field of a current-carrying conductor), which interacts with the magnetic field (that varies over time), which is generated by the rotating permanent magnets 2, which are arranged on the rotating disc 15. This brings about a cyclical compressive load of the piezo elements 4, which is associated with a corresponding generation of electricity.

Just for the sake of completeness it should be pointed out that it is naturally also possible for individual or all of the permanent magnets 2, 3 (i.e. either rotating permanent magnets 2 and/or fixed permanent magnets 3, in particular also in groups) to be replaced by individual electric coils, in particular superconductive coils.

Figure 5:
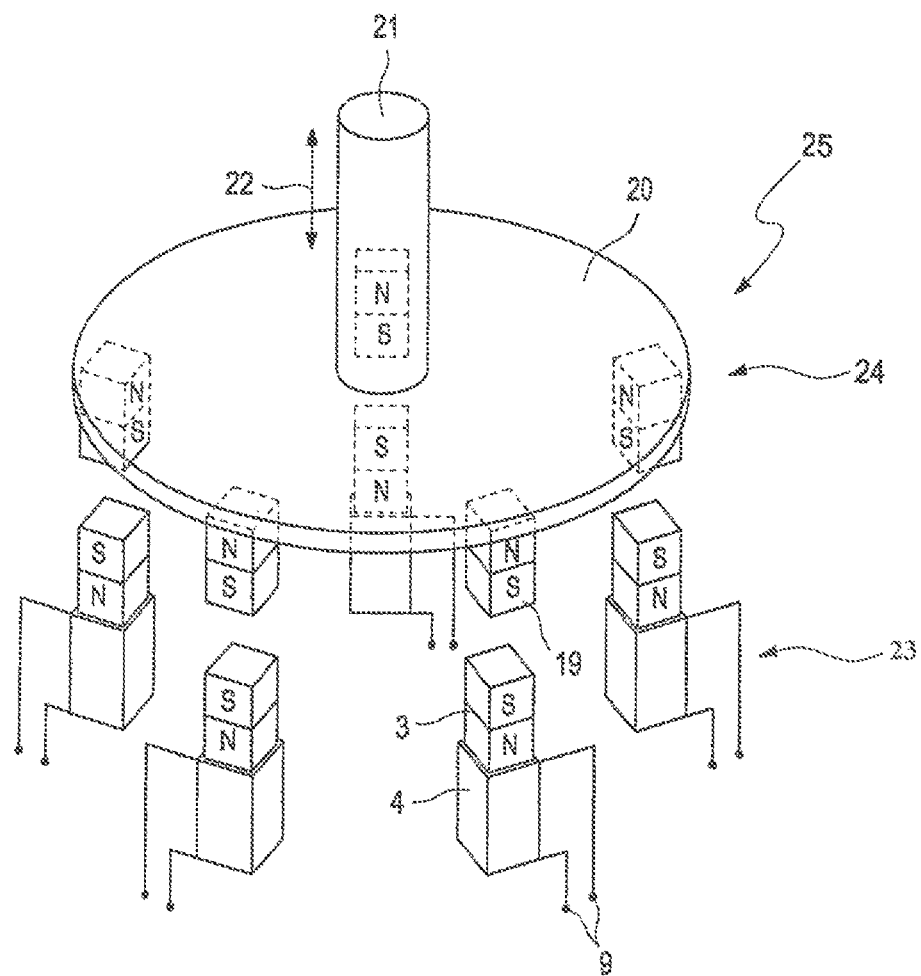
FIG. 5 is a schematic, perspective view of a third embodiment of a piezo generator.

FIG. 5 is a schematic perspective view of a further example of a piezo generator 25. The construction of the present piezo generator 25 shown is largely equivalent to the piezo generator 11 shown in FIG. 3. The present piezo generator 25, however, is not driven by a rotational movement but rather by a "pitch movement" (i.e. a reciprocal movement, which is indicated by the double arrow 22 in FIG. 5). Accordingly this is a drive axle 21, which transmits the pitch movement 22 to the retaining disc 20. In the present case—analogous to the embodiment of a piezo generator 11 shown in FIG. 3—five moving permanent magnets 19 are arranged on the retaining disc 20 (a different quantity of moving permanent magnets 19 and/or fixed permanent magnets 3 naturally also being possible). The drive axle 21, moving permanent magnets 19 and retaining disc 20 together form the moving region 24, which moves relative to the fixed region 23 (consisting of fixed permanent magnets 3 and piezo elements 4).

The distance that varies over time between the moving permanent magnets 19 and the fixed permanent magnets 3 caused by the pitch movement 22 brings about a varyingly strong force onto the piezo elements 4, which in turn results in the generation of corresponding electrical energy (which can be tapped via contact terminals 9).

The piezo generator 25 shown in FIG. 5 is particularly advantageous if there is already a reciprocal movement as a mechanical initial movement.

The principle shown with reference to FIG. 5 can naturally also be transferred to other configurations of piezo generator such as the construction of a piezo generator 12 shown in FIG. 4 in particular as well.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1. Piezo generator
2. Rotating permanent magnets
3. Fixed permanent magnets
4. Piezo element
5. Arrow showing direction of rotation
6. Fulcrum
7. Rotor
8. Stator
9. Contact terminals
10. Piezo generator (variation of 1)
11. Piezo generator
12. Rotor
13. Stator
14. Fulcrum
15. Rotating disc
16. Piezo generator
17. Stator
18. Electric coil
19. Moving permanent magnets
20. Retaining disc
21. Drive axle
22. Reciprocal movement
23. Fixed region
24. Moving region
25. Piezo generator

The invention claimed is:

1. An energy-generating apparatus comprising:
   at least one magnetic field interaction device;
   at least one magnetic field-generating apparatus configured to undergo linear, reciprocal movements relative to the at least one magnetic field interaction device so as to at least intermittently generate a magnetic field that varies over time; and
   at least one energy-generating device including a piezo element device.

2. The energy-generating apparatus according to claim 1, wherein the at least one magnetic field interaction device is rigidly connected to the at least one piezo element device by a mechanical contact.

3. The energy-generating apparatus according to claim 1, wherein at least one of the at least one magnetic field-generating apparatus or the at least one magnetic field interaction device is designed as a permanent magnet device.

4. The energy-generating apparatus according to claim 3 wherein a plurality of permanent magnet devices are provided, the plurality of permanent magnet devices being at least one of: arranged on top of one another with opposite poles in sequence, arranged along a closed periphery, or arranged along a circle.

5. The energy-generating apparatus according to claim 1, wherein a plurality of piezo element devices is provided, the plurality of piezo element devices being arranged along at least one of a closed periphery and a circle.

6. The energy-generating apparatus according to claim 1, wherein the at least one magnetic field interaction device is assigned to a plurality of piezo element devices.

7. The energy-generating apparatus according to claim 1, wherein a tensile connection is formed between at least one region of the at least one magnetic field interaction device and the at least one energy-generating apparatus device.

8. The energy-generating apparatus of claim 2, wherein the mechanical contact includes one or more intermediate components.

9. The energy-generating apparatus of claim 2, wherein the one or more intermediate components include one of a housing device and a retaining device for the magnetic field interaction device.

10. The energy-generating apparatus of claim 2, wherein the magnetic field interaction device is configured to transmit, through the mechanical contact to the at least one piezo element device, mechanical energy produced by a mechanical force on the magnetic field interaction device caused by the magnetic field that varies over time.

11. The energy-generating apparatus of claim 10, wherein the at least one piezo element device is configured to generate electrical energy in response to being deformed by the mechanical energy.

12. The energy generating apparatus of claim 1, wherein the magnetic field that varies over time produced by the reciprocal motion of the at least one magnetic-field generating apparatus relative to the at least one magnetic field interaction device generates a mechanical force that applies a compressive load of changing magnitude that varies over time to the piezo element device.

13. The energy generating apparatus of claim 12, wherein the compressive load causes a longitudinal piezoelectric effect in the piezo element device thereby generating electrical energy.

14. A method for generating electrical energy using at least one piezo element device, the method comprising:
    generating, by linear, reciprocal movements of a magnetic field-generating apparatus relative to at least one magnetic field interaction device, a magnetic field that varies over time; and
    deforming, by mechanical energy produced by a mechanical force caused by an effect of the magnetic field that varies over time on the magnetic field interaction device, the at least one piezo element device to generate electrical energy.

15. The method according to claim 14, wherein the magnetic field interaction device is rigidly connected to the at least one piezo element device by a mechanical contact.

16. The method according to claim 14, wherein the magnetic field that varies over time produced by the reciprocal motion of the at least one magnetic-field generating apparatus relative to the at least one magnetic field interaction device generates a mechanical force that applies a compressive load of changing magnitude that varies over time to the piezo element device.

17. The method according to claim 16, wherein the compressive load causes a longitudinal piezoelectric effect in the piezo element device thereby generating electrical energy.

* * * * *